United States Patent [19]

Hahn et al.

[11] Patent Number: 4,494,910
[45] Date of Patent: Jan. 22, 1985

[54] LARGE SURFACE STRUCTURAL COMPONENT, ESPECIALLY ROTOR BLADE

[75] Inventors: Michael Hahn, Ottobrunn; Franz Sperber, Kolbermoor, both of Fed. Rep. of Germany

[73] Assignee: Messerschmitt-Boelkow-Blohm Gesellschaft mit beschrankter Haftung, Munich, Fed. Rep. of Germany

[21] Appl. No.: 360,214

[22] Filed: Mar. 22, 1982

[30] Foreign Application Priority Data

Apr. 10, 1981 [DE] Fed. Rep. of Germany ....... 3114567

[51] Int. Cl.³ .................... F03D 1/06; B65H 81/00
[52] U.S. Cl. .................... 416/226; 416/230; 156/156; 156/172
[58] Field of Search ............ 416/226, 230 A, 241 B, 416/500, 230; 220/444; 156/156, 172, 175, 173, 176; 29/156.8 H

[56] References Cited

U.S. PATENT DOCUMENTS

| 3,502,529 | 3/1970 | Borgnolo et al. | 416/230 UX |
| 3,779,487 | 12/1973 | Ashton et al. | 416/230 A |
| 3,948,406 | 4/1976 | Papanicolaou et al. | 220/440 |
| 4,113,901 | 9/1978 | Collins | 220/444 X |
| 4,188,171 | 2/1980 | Baskin | 416/500 X |
| 4,242,160 | 12/1980 | Pinter et al. | 416/226 X |
| 4,247,258 | 1/1981 | Griffee, Jr. et al. | 416/226 X |

Primary Examiner—Robert E. Garrett
Assistant Examiner—Joseph M. Pitko
Attorney, Agent, or Firm—W. G. Fasse; D. H. Kane, Jr.

[57] ABSTRACT

A large surface structural component, such as a rotor blade for a windmill or a blade root for a windmill rotor, includes a hollow core (6) of foam material supporting a shell (8, 11) of fiber reinforced synthetic material. Positive templates in the form of disks (5) are inserted into the core (6). These templates are preferably spaced from each other along the length of the structural component and have a shape which defines the cross-sectional contour of the finished component. Thus, initially foam sections having a shape convenient for their production and these templates are assembled on a rotatable arbor (2) which is then rotated in a machining operation such as cutting and/or grinding on a lathe type machine. The shape of these templates (5) provides a guide for the machining operation which is thus substantially facilitated while simultaneously permitting the use of foam cores having initially plane surfaces.

10 Claims, 5 Drawing Figures

LARGE SURFACE STRUCTURAL COMPONENT, ESPECIALLY ROTOR BLADE

CLAIM TO PRIORITY

The present application is based on German Ser. No. P 31 14 567.1, filed on Apr. 10, 1981 in the Federal Republic of Germany. The priority of the German filing date is claimed for the present application.

BACKGROUND OF THE INVENTION

The present invention relates to a large surface structural component, especially rotor blades or parts of such rotor blades, especially blade roots. Such large surface rotor blades are, for example, used in large scale wind energy collection equipment.

Rotor blades for so-called large scale wind energy collecting systems are primarily constructed of synthetic materials in order to achieve a lightweight structure and for other reasons, for example costs. According to a previously filed German Patent Application No. P 30 14 347.6-16 the blade shell is, for example, made of fiber reinforced synthetic material such as glass fiber reinforced material impregnated by synthetic resin. The blade core on the other hand is made of a hard foam material such as polyvinylchloride or the like. It has been found that with the increasing length of such components and with the increasing depth as measured from the leading edge to the trailing edge of the rotor blade, for example, substantial difficulties are encountered when efforts are being made to manufacture such components by employing time proven manufacturing techniques. This applies for the rather cost effective fiber winding method as well as to other conventional methods. The fiber winding method has already been employed in the construction of a helicopter rotor blade as disclosed in German Patent Publication (DE-OS) No. 26 11 235. No problems or difficulties are encountered as long as the structural component has dimensions within certain conventional limits. Such conventional limits are due to the conventional manufacturing methods which employ so-called negative molds for the manufacture of rotor blades. The use of such negative molds becomes rather prohibitive with regard to costs when it is necessary to produce large surface rotor blades or individual components of such rotor blades, especially when the surface configuration of such blades is complicated. Thus, it has, for example, been found that a rotor blade having a profile depth from the leading edge to the trailing edge of the blade of seven meters, the manufacture for example of the blade root by means of a negative mold, is economically unfeasible, especially if the blade root must have a cross-sectional contour which varies in its profile from the connecting end of the blade root to the blade section proper, for example, when the profile depth is to decrease from the blade end to the connecting end of the blade root.

OBJECTS OF THE INVENTION

In view of the foregoing it is the aim of the invention to achieve the following objects singly or in combination:

to avoid the use of a negative mold in the manufacture of large surface structural components such as rotor blades for windmills and the like;

to provide a method for manufacturing such large surface structural components without a negative mold;

to employ fiber reinforced materials which are resin impregnated in the manufacture of these components, whereby the bonding resulting from the curing of the resin materials interconnects the elements which make up the large surface component; and to facilitate the machining operation such as cutting and grinding or polishing of these large surface structural components.

SUMMARY OF THE INVENTION

A large surface structural component having a given cross-sectional contour comprises according to the invention a core of foam material and a shell of fiber reinforced material supported by the core as well as positive template elements inserted in the core. The positive template elements, have a circumferential contour corresponding at least partially or substantially to the given cross-sectional contour of the structural component for defining a guide limit for a subsequent machining operation on the structural component.

According to the invention there is further provided a method for manufacturing such components in which a plurality of positive disk type templates are removably secured to a rotatable arbor at spaced intervals along the arbor. The templates have a circumferential contour corresponding to the given cross-sectional contour of the finished structural component. Sections of foam material not requiring any particular shape at this point are then adhesively bonded to the templates so that they are removable from the arbor together with the templates. The sections of foam material protrude radially outside of the templates as viewed relative to the longitudinal axis of a structural component such as a windmill blade. Thereafter, the foam material is machined down to a shape corresponding to that defined by the templates for forming the given contour without the need of a negative mold. After the machining or grinding is completed a shell of fiber reinforced synthetic material is wound onto the machined core of foam material. All elements of the final structure are bonded to each other by the curing of the fiber reinforced synthetic material to the foam material and to the template and by adhesive bonds where required.

The positive templates subdivide the longitudinal supporting core into a plurality of core sections which are bonded to the templates which form contour defining markers in a blank which is ready for a machining or cutting and grinding and polishing operation on a rotating arbor. It is preferable that the core removably held on the rotatable arbor is hollow, whereby the hollow space or cavity for the arbor extends from end to end so that the arbor may pass entirely through the structural component. The hollow space for the arbor is preferably defined by plane surface areas so that the foam material sections may also have plane surfaces. The foam material sections forming the core are bonded to each other and to the templates by a suitable adhesive to form the blank suitable for a lathe type machining or grinding operation.

If desired, the core may reinforced by first applying to the arbor in a removable manner an inner lining made of fiber reinforced synthetic material in which the fibers are oriented in a crosswise arrangement. This inner lining may be simply produced prior to the securing of the templates in a conventional fiber winding operation to form a fiber lamination on the arbor to which then the foam sections forming the core and the templates are applied. The outer shell and reinforcing fiber laminations inserted into the shell may also be simply manufactured by conventional fiber winding techniques or by simply layering fiber webbings to form the outer shell on the core.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
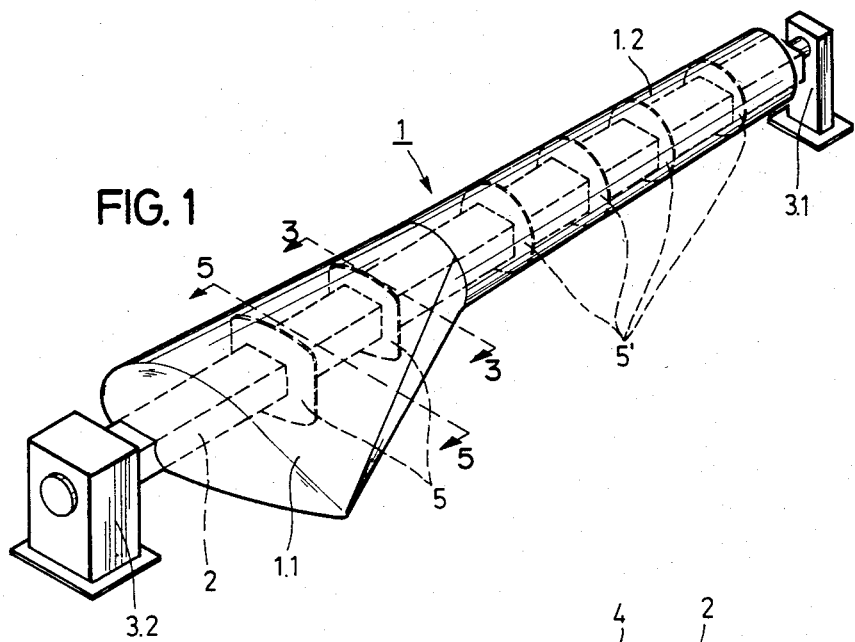
FIG. 1 is a perspective view of a winding arbor with portions of a large surface windmill blade held thereon.

FIG. 1 shows a perspective view of a large surface structural component such as the portion of a wing or rotor blade for the rotor of a windmill. Such rotors may have but a single blade including a blade root 1 connected on one end to a blade transition area 1.1 and connected at its other end to a counter weight carrying shaft 1.2. The just mentioned elements of a windmill wing are removably secured to a winding arbor 2 rotatably held at its ends in support structures 3.1 and 3.2 comprising conventional means for rotating the arbor 2.

Figure 2:
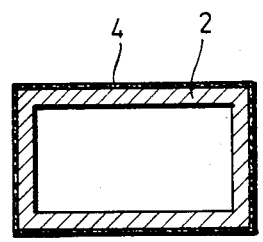
FIG. 2 is a sectional view through the arbor.

Preferably, the present structure is hollow and the inner surface of the hollow cavity is provided with a lining 4 shown in FIG. 2. Thus, where such a lining is used, the first production step is the winding of fiber reinforced webbings onto the arbor 2 to form the inner lining 4 which is removable from the arbor 2 for example, by coating the arbor with a coating which prevents any bonding of the lining 4 to the arbor 2. The fiber direction in the lining 4 is arranged in a cross-over relationship at ±45° in the fiber orientation in a fiber matrix which is impregnated with a cold curing synthetic resin.

Figure 3:
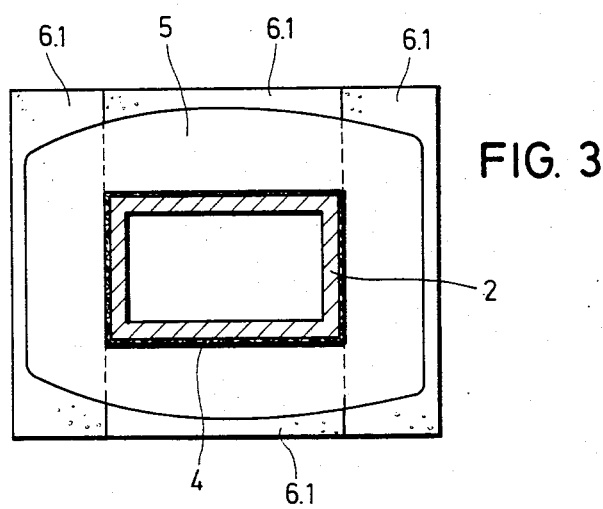
FIG. 3 is a view partially in section against the plane indicated by section line 3—3 in FIG. 1.

In the second manufacturing step the templates 5 are secured to the lining 4, for example, by a suitable adhesive. The templates 5 have a circumferential contour corresponding substantially or approximately to the cross-sectional given contour of the finished product. Thus, the templates 5 shown in the connecting section 1.1 have the shape best seen in FIG. 3 whereas the templates 5' in the shaft portion 1.2 have a somewhat more rounded circumferential contour or configuration. The positive templates 5 define the outer contour of a supporting core 6 shown in FIG. 4. According to the invention the hollow cavity inside the structural component has plane straight walls so that it is possible to advantageously use core forming sections 6.1 also having straight walls. Initially, these foam material sections 6.1, for example of polyvinylchloride, protrude radially outwardly from the templates 5, 5' as best seen in FIG. 3. The foam material sections 6.1 are bonded to each other by a suitable adhesive. Further, they are bonded to the templates 5 and to the inner lining 4 also by a suitable adhesive. As shown in the example of FIG. 3 four rectangular foam material sections 6.1 are employed in the formation of the supporting core 6.

When the adhesive bonding is sufficiently cured, the blank shown in FIG. 3 is ready for a lathe type machining operation, for example, by cutting off the portions of the core sections 6.1 protruding radially outwardly of the contour of the templates 5, 5'. It is advantageous to make the templates 5, 5' of a material harder than the foam material of the sections 6.1. It has been found that hardwood is suitable for making the templates 5, 5'. Thus, the templates assure that the machining operation does not proceed radially inwardly beyond a contour defined by these templates 5, 5'.

Figure 4:
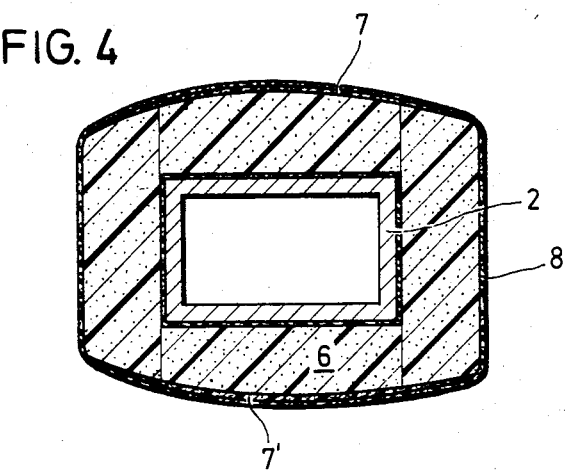
FIG. 4 is a view similar to that of FIG. 3, however, showing the cross-section of the structural component after an intermediate machining step and after winding of the outer shell.

Depending on the strength requirement to be satisfied by the structural component 1, further strengthening is achieved by applying a shell 8 around the core 6 as best seen in FIG. 4. The shell may be applied by a conventional laminating or winding process. Prior to the application of the shell, reinforcement layers of fiber reinforced material may be laminated to the upper and lower surface of the core as shown at 7 and 7' in FIG. 4. These layers or laminations 7, 7' have a high tensile strength in the longitudinal direction of the component. The fibers of the laminations 7, 7' extend substantially uni-directionally in parallel to the longitudinal axis of the component. Carbon fibers have been found to be suitable for this purpose. The shell 8 is preferably wound in the same manner as has been described above with reference to the inner lining 4, whereby again, the fibers in the shell 8 extend at a ±45° fiber orientation. The shell may be wound of a fabric of glass fibers reinforced by a synthetic resin. The curing of the resin will bond the shell 8 to the core sections 6.1 and to the longitudinally extending reinforcement layers 7, 7'.

Figure 5:
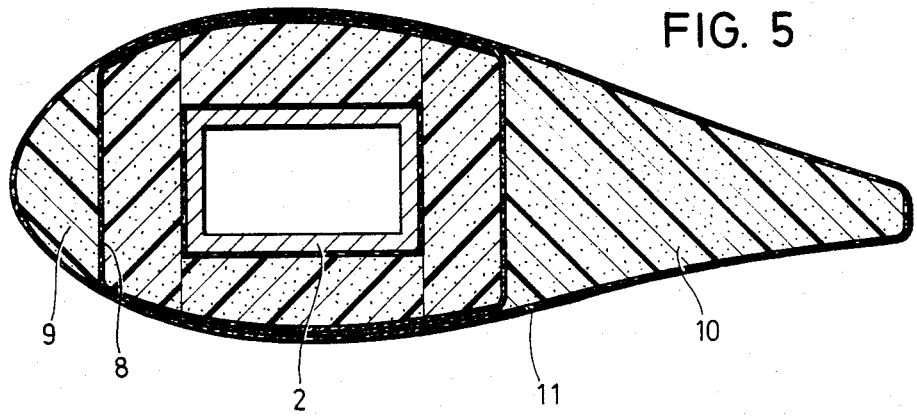
FIG. 5 is a sectional view along section line 5—5 in FIG. 1.

As shown in FIG. 5 the transition zone 1.1 between the blade root proper and the wind blade (not shown) may be shaped by securing to the leading edge a filler member 9 and to the trailing edge another filler member 10. These filler members 9 and 10 are also made of foam material and are bonded to the leading and trailing edge by a suitable adhesive. Thereafter, in a further winding operation an outer shell 11 of fiber reinforced synthetic material is would around the filler elements and the blade structure in the transition zone 1.1. As shown in FIG. 1, templates 5 of a shape somewhat different as compared to the shape of the templates 5' may be inserted into the inner portion of the transition zone 1.1. Alternately, the templates in the transition zone 1.1 may have a size defining also the shape of the filler member 9 and of the filler member 10. Depending on the profile depth from the leading edge to the trailing edge of the transition zone 1.1 it may not be necessary to employ such filler elements. In such an instance the templates 5 would be shaped accordingly to rovide the required cross-sectional contour or profile lso in the transition zone 1.1. Again the respectively saped positive templates would act as a guide for the mahining or cutting operation also in the transition zone 1.1.

The above described manufacturing steps permit a relatively simple and rapid manufacturing of large scale structural components even if these components have extreme surface dimensions and rather complicated surface configurations. The final step merely involves pulling the structural component off the winding arbor 2.

Although the invention has been described with reference to specific example embodiments, it will be appreciated, that it is intended to cover all modifications and equivalents within the scope of the appended claims.

What is claimed is:

1. A large surface structural component, such as a rotor blade, having a given cross-sectional finished contour, comprising a plurality of support core sections of foam material forming a support core, said support core sections initially having an excess dimension, a plurality of disk type positive templates inserted in said support core so that each disk type positive template is rigidly connected to two adjacent core sections for interconnecting the core sections in a force transmitting manner, said disk type positive templates having a circumferential contour corresponding at least partially or substantially to said given cross-sectional finished contour of the structural component for defining a guide limit for a subsequent machining operation on said core sections for removing said excess dimension of said core sections, and a shell of fiber reinforced material for enveloping said support core.

2. The structural component of claim 1, wherein said disk type positive templates (5) are adhesively bonded to said core sections so that the disk type templates become a permanent part of the structural component in which the templates extend radially.

3. The structural component of claim 1 or 2, wherein said positive template means are made of a material which is relatively hard compared to the foam material of said core sections.

4. The structural component of claim 1 or 2, wherein said core sections (6) of foam material have a hollow central space extending the length of the support core and having plane walls defining said hollow central space.

5. The structural component of claim 4, comprising a lining (4) of fiber reinforced synthetic material defining said hollow central space, said lining having a crosswise fiber orientation.

6. The structural component of claim 5, wherein said lining (4) is made of a glass fiber winding lamination.

7. The structural component of claim 1, further comprising an upper sheet (7) of fiber reinforced synthetic material and a lower sheet (7') of fiber reinforced material, said sheets being interposed between said shell (8, 11) and said support core of foam material, said fiber reinforced upper and lower sheets (7, 7') comprising a fiber laminate with unidirectionally oriented fibers extending substantially in parallel to a longitudinal axis of said support core.

8. The structural component of claim 7, wherein said shell of fiber reinforced material surrounding said support core comprises a fiber webbing in which the fibers are arranged in a crosswise orientation.

9. The structural component of claim 1 or 8, further comprising filler members (9, 10) operatively secured to a leading and trailing edge of the structural component, and a further shell (11) of fiber reinforced material enclosing said filler members and the first mentioned shell (8).

10. The structural component of claim 9, further comprising adhesive bonding means providing a force transmitting bond between said support core and said shell of fiber reinforced material.

* * * * *